(12) United States Patent
Kaminsky et al.

(10) Patent No.: US 8,283,831 B1
(45) Date of Patent: Oct. 9, 2012

(54) BRUSHLESS DC MOTOR HAVING MULTIPLE PARALLEL WINDINGS

(75) Inventors: Ilya Kaminsky, El Cajon, CA (US); Robert J. Ferran, San Diego, CA (US)

(73) Assignee: Electro-Mariner Corp., San Diego, CA (US)

( * ) Notice: Subject to any disclaimer, the term of this patent is extended or adjusted under 35 U.S.C. 154(b) by 0 days.

(21) Appl. No.: 13/224,715

(22) Filed: Sep. 2, 2011

Related U.S. Application Data

(60) Provisional application No. 61/380,694, filed on Sep. 7, 2010.

(51) Int. Cl.
H02K 16/04 (2006.01)
(52) U.S. Cl. ............... 310/198; 310/71; 310/112
(58) Field of Classification Search ........ 310/71, 310/112–114, 159, 184, 179, 180, 198
See application file for complete search history.

(56) References Cited

U.S. PATENT DOCUMENTS

| | | | |
|---|---|---|---|
| 1,273,782 A | 7/1918 | Hobart | |
| 1,497,448 A | 2/1919 | Keith | |
| 1,503,245 A | 7/1924 | Reed | |
| 1,915,778 A | 9/1930 | Dreese | |
| 3,611,088 A | 10/1971 | Hill | |
| 3,611,091 A | 10/1971 | Genovese | |
| 3,624,472 A | 11/1971 | Graham | |
| 3,633,055 A | 1/1972 | Maier | |
| 3,930,190 A | 12/1975 | Liska | |
| 4,208,620 A | 6/1980 | Ringland | |
| 4,329,122 A * | 5/1982 | Owada et al. | 417/365 |
| 4,381,465 A | 4/1983 | Renkl et al. | |
| 4,513,237 A | 4/1985 | Ford | |
| 4,678,972 A | 7/1987 | Lehnhoff et al. | |
| 4,918,347 A | 4/1990 | Takaba | |
| 4,937,485 A | 6/1990 | Mihalko | |
| 5,229,676 A * | 7/1993 | Bood | 310/114 |

(Continued)

FOREIGN PATENT DOCUMENTS

WO 9949563 A1 9/1999

OTHER PUBLICATIONS

Munoz, Alfredo R. et al., "Dual Stator Winding Induction Machine Drive," IEEE Transactions on Industry Applications, vol. 36, No. 5, Sep./Oct. 2000, pp. 1369-1379.

*Primary Examiner* — Quyen Leung
*Assistant Examiner* — Naishadh Desai
(74) *Attorney, Agent, or Firm* — Jerry Turner Sewell

(57) ABSTRACT

A brushless DC motor has at least three stator sections and a single rotor rotating with the three stator sections. Each stator section is wound with three parallel windings having respective three nodes. Each stator section has nine terminals providing independent access to each node so that separate voltages and currents are applied to each parallel winding in the stator section. Thus, the current applied to each stator section is divided substantially equally among the three parallel windings, thereby reducing the current in each winding for the same power requirement for the motor, which reduces the $I^2R$ losses in the windings and the supply wiring and reduces the power handling requirements in the electronic switches providing the supply voltages. The three parallel windings are connected to external terminals of the motor to form either a delta winding configuration or a wye (star) winding configuration.

1 Claim, 5 Drawing Sheets

U.S. PATENT DOCUMENTS

| | | |
|---|---|---|
| 5,705,909 A | 1/1998 | Rajashekara |
| 5,804,904 A | 9/1998 | Park et al. |
| 6,153,953 A * | 11/2000 | Isozaki et al. .......... 310/216.112 |
| 6,157,112 A | 12/2000 | Suzuki et al. |
| 6,380,653 B1 | 4/2002 | Seguchi |
| 7,038,405 B2 | 5/2006 | Makinen et al. |
| 7,417,355 B2 | 8/2008 | Shichijo et al. |
| 7,564,156 B2 | 7/2009 | Okumoto et al. |
| 7,592,728 B2 * | 9/2009 | Jones et al. .................... 310/112 |
| 7,800,276 B2 * | 9/2010 | Purvines ...................... 310/266 |

* cited by examiner

BRUSHLESS DC MOTOR HAVING MULTIPLE PARALLEL WINDINGS

RELATED APPLICATIONS

The present application claims the benefit of priority under 35 USC §119(e) to U.S. Provisional Application No. 61/380,694, filed on Sep. 7, 2010.

BACKGROUND OF THE INVENTION

1. Field of the Invention

The present invention is generally in the field of electric motors that receive electrical energy from an energy storage device and that drive a propulsion system.

2. Description of the Related Art

Battery-powered electric motors are well known and have been used to provide rotational energy to drive propulsion systems for vehicles, including, for example, watercraft. In general, vehicles driven by battery-powered electric motors have a limited range or limited performance (e.g., limited velocity and acceleration). In order to provide enhanced performance, additional energy must be supplied to the electric motors in the watercraft or other vehicle. Increasing the power necessitates increasing the voltage or the current or both the voltage and the current provided to the electric motors. However, increasing the current provided to an electric motor increases the resistive power losses in the circuits providing energy to the motor. Increasing the voltage to an electric motor decreases the resistive power losses in the supply circuits; however, high voltages are not desirable in vehicles and are particularly undesirable in a watercraft because of the unavoidable presence of water in proximity to the high voltages.

SUMMARY OF THE INVENTION

A brushless DC motor operates with lower input voltages. The motor is modular in design so that a plurality of stator sections are mechanically interconnected in tandem within a common housing with the stator sections providing magnetic fields to drive a rotor (armature) for the motor. Each stator section in the motor is wound with multiple sets of parallel windings on the poles of the stator section with each set of the windings interconnected to form a delta winding configuration or a wye (star) winding configuration. Each set of windings is connected to three terminals. Each of the three terminals of each of the set of windings in each stator section is coupled to a respective power input terminal so that each power input terminal of each set of windings is driven independently of the corresponding terminals on the other sets of windings of the stator section. Accordingly, the currents provided to each of the parallel sets of windings are reduced because of the cumulative effect of the parallel sets of windings on the same stator. The resistive losses in the circuitry to each set of windings and within each set of windings are reduced so that the voltages applied to each terminal of each set of windings are lower and can be maintained within a safe range for use on a watercraft.

Each of the three parallel windings is driven by a respective voltage source (motor controller) which generates the three-phase voltages from a battery source. Since the voltages and currents are lower than in a conventional single winding electric motor having the same horsepower, the transistors and other components within the voltage source have lower voltage, current and power ratings than would otherwise be required to drive the motor. The voltage sources for the parallel windings in each stator section are driven synchronously with each other so that the effects of the currents are cumulative. The plurality of stators sections are also driven synchronously.

BRIEF DESCRIPTION OF THE DRAWINGS

The foregoing aspects and other aspects of this disclosure are described in detail below in connection with the accompanying drawing figures in which.

DETAILED DESCRIPTION OF A PREFERRED EMBODIMENT

Figure 1:
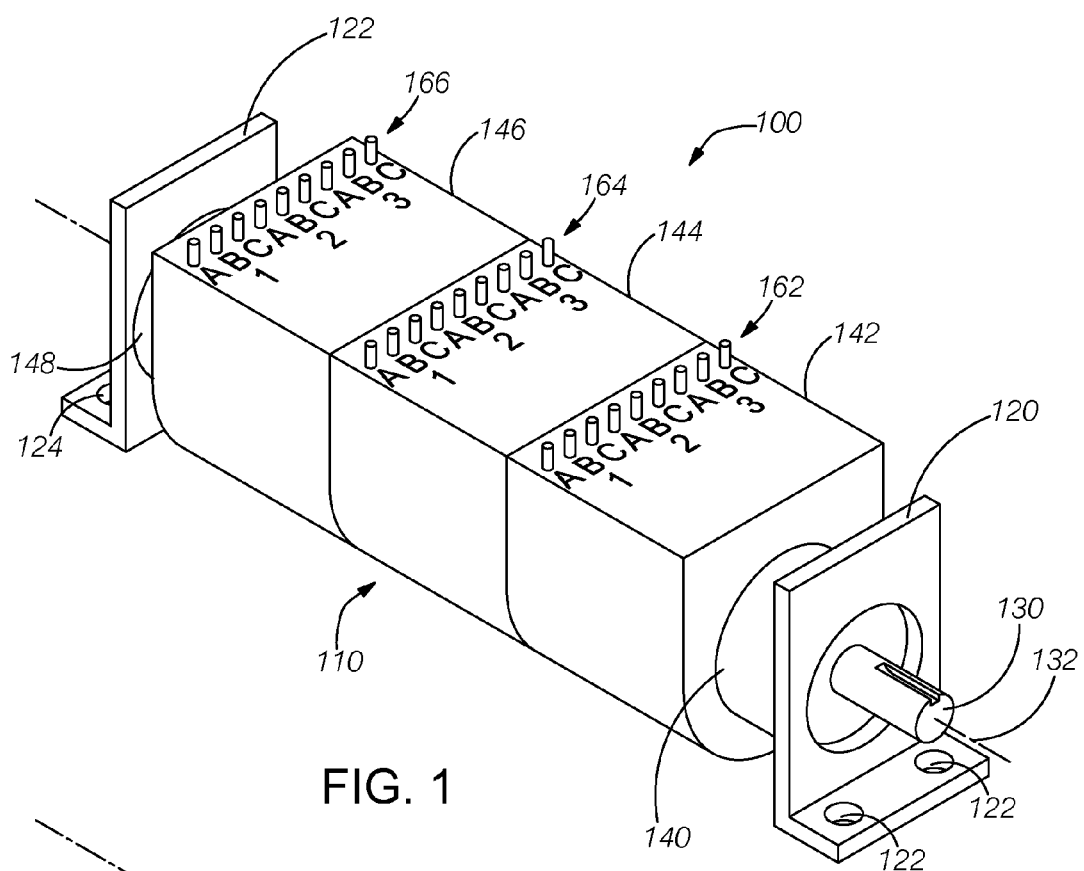
FIG. 1 illustrates a perspective view of an exemplary multiple parallel winding electric motor having multiple stator modules.

FIG. 1 illustrates a perspective view of an exemplary parallel winding electric motor 100 that embodies aspects of the present invention. The motor comprises an outer casing 110 having a mounting system to secure the motor to a watercraft or other vehicle. For example, in the illustrated embodiment, the motor includes a front L-shaped mounting bracket 120 and a rear L-shaped mounting bracket 122 proximate the respective ends of the casing. Each mounting bracket includes suitable mounting features (e.g., holes 124) to receive bolts to mount the motor. Other mounting systems can also be used to secure the motor to the watercraft or other vehicle. A rotatable shaft 130 passes through an opening in the mounting bracket at one end of the casing. The rotor rotates about a centerline 132. After mounting the motor in the watercraft, the shaft is coupled to a drive system (not shown), such as, for example, a propeller via suitable coupling devices.

In the illustrated embodiment, the motor 100 is modular. In particular, the motor comprises five sections that are coupled together to form the complete motor. A first section 140 comprises a front bearing section that supports the rotatable shaft proximate to the output end of the shaft. The front bearing section is coupled to and supported by the front mounting bracket via suitable engagement devices (not shown). The second section 142, the third 144 and the fourth section 146 of the motor are stator sections (described below). The fifth section 148 is a rear bearing section that supports the second end of the shaft opposite the output end. The rear bearing section is coupled to and supported by the rear mounting bracket 122 via suitable engagement devices (not shown). In the illustrated embodiment, the second end of the shaft is enclosed within the rear bearing section. In alternative embodiments, the second end of the shaft may extend from the rear bearing section so that the second end of the shaft of one motor may be connected to the output end of another motor in order to connect the motors in tandem.

Each of the five sections 140, 142, 144, 146, 148 has an outer casing with engagement features (not shown) so that each outer casing can be mechanically connected to an adjacent section. The outer casings of the three stator sections and the outer casings of the first and second bearing sections of the motor are securely coupled together so that the outer casings of the five sections form a combined continuous outer casing of the motor.

Figure 2:
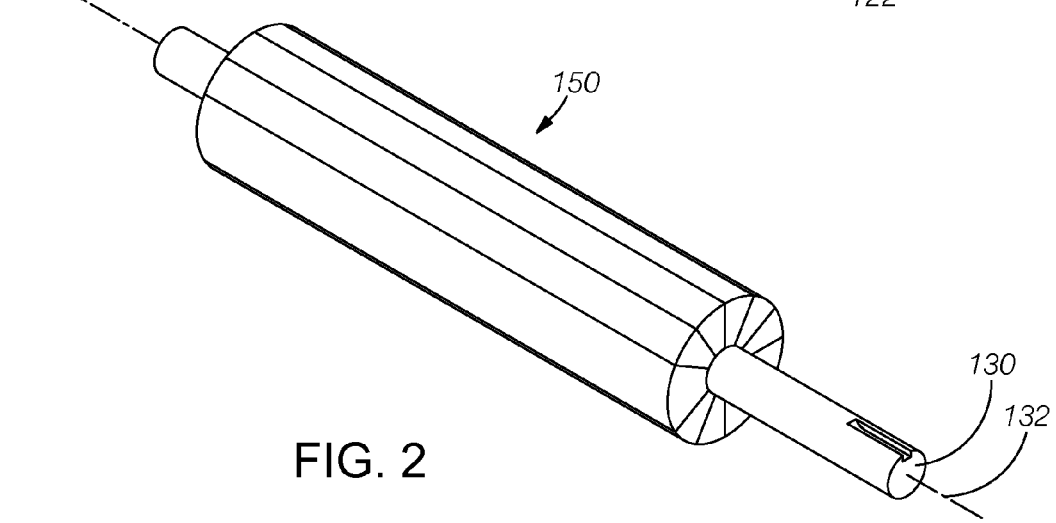
FIG. 2 illustrates a simplified perspective view of a rotor that rotates within the multiple stator modules of the motor of FIG. 1.

Although the motor 100 comprises three stator sections 142, 144, 146, the motor comprises only a single rotor (or armature) 150 that is formed on the shaft 130 between the output end of the rotor and the second end of the shaft as illustrated in FIG. 2. The rotor is positioned so that the rotor rotates within the cylindrical opening formed in each of the stator sections and is thus affected by the magnetic forces generated by the stator sections. In the illustrated embodiment, the rotor is a permanent magnet rotor configured with multiple poles. Although illustrated as a single rotor with continuous poles, in certain embodiments, the poles of the rotor may comprise three sections corresponding to the three stator sections.

The outer casing of each stator section 142, 144, 146 supports nine input terminals grouped as three groups of three terminals. In particular, the first stator section 142 includes a first set 162 of nine terminals comprising three terminals labeled as "A," "B" and "C" in a group "1," three terminals labeled as "A," "B" and "C" in a group "2" and three terminals labeled as "A," "B" and "C" in a group "3." The second stator section 144 includes a second set 164 of nine terminals in three groups of three terminals and labeled with labels corresponding to the labels of the first stator section. The third stator section 146 includes a third set 166 of nine terminals in three groups of three terminals and labeled with labels corresponding to the labels of the first stator section.

Figure 3:
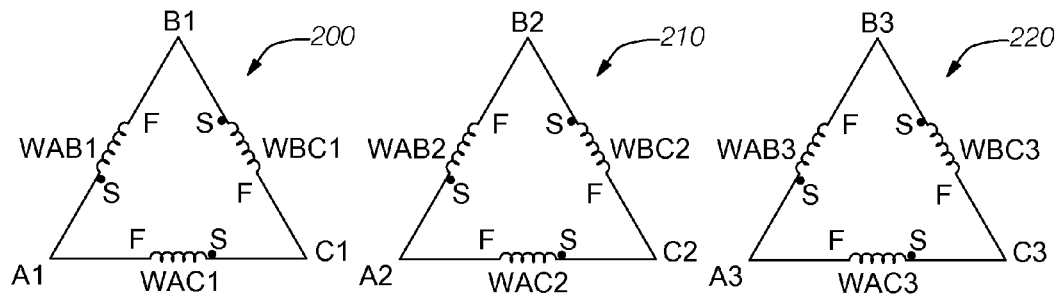
FIG. 3 schematically illustrates the three parallel windings in a stator module of the motor of FIG. 1 configured as parallel delta windings.
Figure 4:
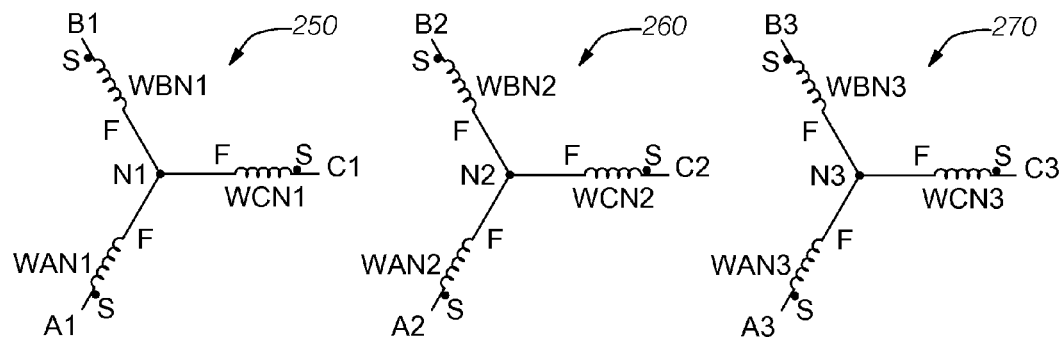
FIG. 4 schematically illustrates the three parallel windings in a stator module of the motor of FIG. 1 configured as parallel wye (star) windings.

Within each stator section, the nine terminals are connected to three parallel-wound windings ("parallel windings"), which are illustrated in FIGS. 3 and 4 for one of the stator sections. FIG. 3 illustrates the three parallel windings for a stator section interconnected in a delta configuration. FIG. 4 illustrates the three parallel windings for a stator section configured in a wye (star) configuration.

In FIG. 3, the first set of three terminals ("A," "B" and "C") in group "1" are connected to a first delta winding 200 comprising a first winding section WAB1 between terminal A1 (e.g., terminal "A" in group "1") and terminal B1, a second winding section WBC1 between terminal B1 and terminal C1 and a third winding section WAC1 between terminal C1 and terminal A1.

The second set of three terminals ("A," "B" and "C") in group "2" are connected to a second delta winding 210 comprising a first winding section WAB2 between terminal A2 (e.g., terminal "A" in group "2") and terminal B2, a second winding section WBC2 between terminal B2 and terminal C2 and a third winding section WAC2 between terminal C2 and terminal A1.

The third set of three terminals ("A," "B" and "C") in group "3" are connected to a third delta winding 220 comprising a first winding section WAB3 between terminal A3 (e.g., terminal "A" in group "3") and terminal B3, a second winding section WBC3 between terminal B3 and terminal C3 and a third winding section WAC3 between terminal C3 and terminal A3.

As illustrated in FIG. 3, each stator in each stator section is wound with three independent delta windings referred to herein as a "triple-delta winding." In FIG. 3, each section of each winding is labeled with an "S" and a dot at one end of the winding to indicate the start of the winding and is labeled with an "F" at the opposite end to indicate the finish of the winding. The labeling is used in the pictorial illustrations of the windings described in FIGS. 6 and 7. In the illustrated embodiment, the connections between the start (S) ends of the winding sections and the finish (F) ends of the respective adjacent winding sections are made within the motor housing so that the interconnected ends of the winding sections are connected to the nine external terminals as shown. In alternative embodiments, both the start (S) end and the finish (F) end of each winding section is provided as an external terminal (18 in all) so that the winding sections may be interconnected externally.

FIG. 4 illustrates the parallel winding sections of a stator section configured as three parallel wye (star) windings. In FIG. 4, each of the winding sections in one of the three parallel sets of windings has a respective start (S) end connected to an external terminal. For example, a first one of the parallel wye windings 250, a first winding section WAN1 has the start (S) end connected to the external terminal A1, a second winding section WBN1 has the start end connected to the external terminal B1, and a third winding section WCN1 has the start end connected to the external terminal C1. The respective finish (F) ends of the three winding sections are connected together at a common node N1 to complete the first wye configuration. Similarly, a second of the parallel wye windings 260 has the start (S) ends of three winding sections WAN2, WBN2, WCN2 connected to respective external terminals A2, B2, C2, and has the finish (F) ends connected together at a common node N2 to complete the second wye configuration. Similarly, a third of the parallel wye windings 270 has the start (S) ends of three winding sections WAN3, WBN3, WCN3 connected to respective external terminals A3, B3, C3, and has the finish (F) ends connected together at a common node N3 to complete the third wye configuration. The connections between the finish (F) ends of the windings at the common nodes may be made internally within the housing. Alternatively, in certain embodiments as discussed above, both the start (S) ends and the finish (F) ends of each winding section are externally accessible so that the windings may be connected in the delta configuration shown in FIG. 3 or in the wye configuration shown in FIG. 4.

Figure 5:
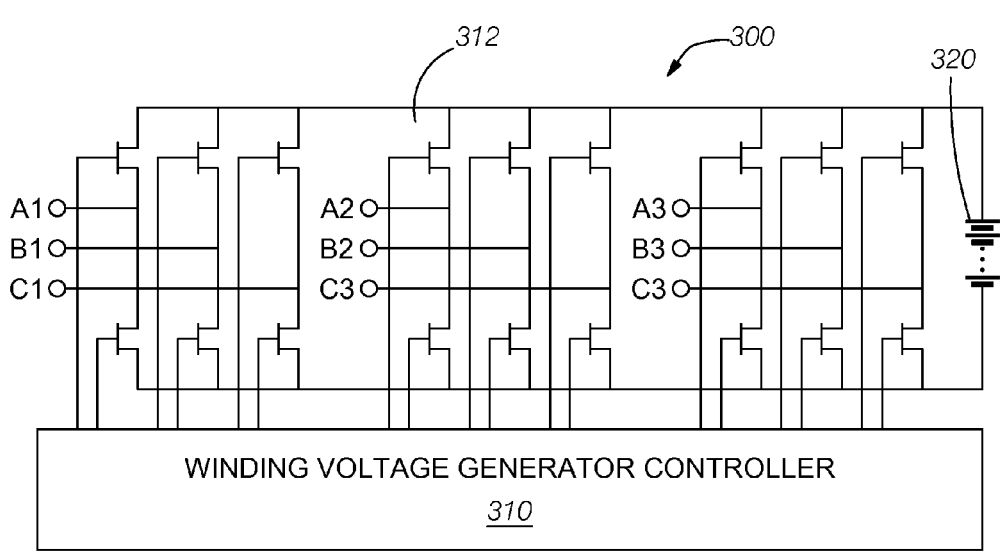
FIG. 5 illustrates an electrical block diagram of a control circuit and power switching transistor array for driving the three parallel windings of FIG. 3.

FIG. 5 illustrates a block diagram of a winding voltage generator 300 which generates the winding voltages for one of the three stator sections. In particular, a winding voltage generator controller 310 produces control signals that are provided to an array 312 of pairs of switching transistors (e.g., MOSFETs) connected between the positive and negative outputs of a battery 320. For example, in one embodiment, the battery advantageously comprises a 50-volt battery, which is a voltage that is reasonably safe in a marine environment. The control signals are produced in conventional manner so that each pair of switching transistors produces a selected synthesized voltage waveform on a respective one of the nine terminals labeled as "A1," "B1," "C1;" "A2," "B2," "C2;" and "A3," "B3," "C3," which correspond to the like-identified terminals of the triple-delta windings 200, 210, 220 shown in FIG. 3 or to the like-identified terminals of the triple-wye windings 250, 260, 270 in FIG. 4. Preferably, the synthesized waveforms on each set of three winding sections are phased to be approximately 120 degrees apart. The waveforms may be synthesized to be generally sinusoidal, to be generally trapezoidal or to have another suitable shape. The following discussion applies to the triple-delta winding configuration of FIG. 3. It is understood that a similar discussion applies to the triple-wye winding configuration of FIG. 4.

The voltage waveforms output from each set of three terminals from the array 310 are properly phased for the respective delta winding 200, 210 or 220 to produce synchronous operation of the motor 100. The voltage waveforms for the three sets of waveforms are synchronized so that the electromagnetic fields produced by the three sets of windings are cumulative. Thus, the triple delta windings in each stator section provides substantially the same effect as a single delta winding stator operating at three times the current. Accordingly, the wire sizes in the windings and the interconnection wiring and the transistors sizes in the array can be reduced. Furthermore, the $I^2R$ (heating) losses are reduced by approximately ⅑ since only about ⅓ of the current flows in the wiring in each winding and the respective supply wiring with respect to a single delta wound stator.

The current requirements in windings, supply wiring and the switching components are further reduced by ⅓ by including the three stator sections 142, 144, 146 instead of a single stator section. In particular, the nine terminals of each stator section are driven by a respective one the winding voltage generator controllers 310 illustrated in FIG. 5. The three controllers are operated synchronously so that the three stator sections operate together to provide substantially the same power as a single stator requiring approximately three times the current. In summary, the motor 100 illustrated herein can provide substantially the same mechanical output power as a corresponding single stator, single delta-wound motor operating at 300 amperes per input terminal with only approximately ⅑ of the input current (e.g., approximately 33.3 amperes) per input terminal with a corresponding reduction in $I^2R$ losses (e.g., approximately ¹⁄₈₁ of the losses if the higher resistance of smaller wiring is ignored).

Figure 6:
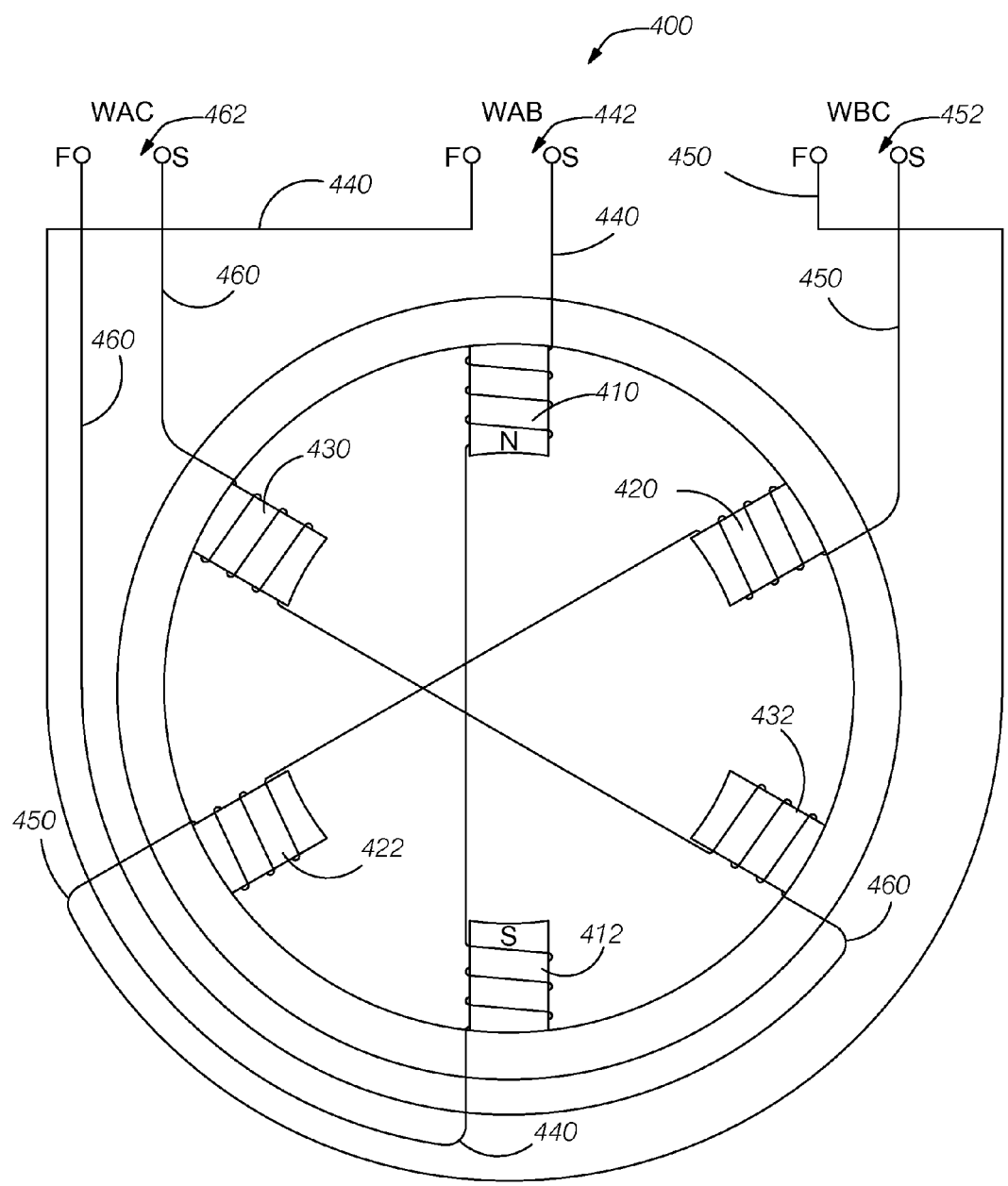
FIG. 6 pictorially illustrates a single parallel-wound stator module.

FIG. 6 pictorially illustrates a portion of the inside structure of an exemplary stator section 400 wound in accordance with a conventional single-delta winding or single-wye winding. As illustrated, the stator section comprises a first pair of poles 410, 412, a second pair of poles 420, 422, and a third pair of poles 430, 432. The poles in each pair diametrically across from each other and are labeled as "N" and "S" as a convenient indication that the magnetic fields produced in each pole in a pair are complementary. It is understood, however, that the magnetic fields produced in a pole pair are constantly changing in response to the applied waveform, and the "N" and "S" labels are for identification of the pole pairs only and not an indication of a state of the magnetic field produced by the pole pair.

The first pole pair 410, 412 is wound with a first winding 440 that extends from a terminal "S" in a first pair of terminals 442, then around both poles and to a terminal "F" in the first pair of terminals. The first winding corresponds to one of the windings "WAB" in FIG. 3; however, since the illustrated stator only has a single winding, no number is included to identify the winding. In FIG. 6, the terminals "S" and "F" correspond to the labeled ends of the winding sections in FIG. 3. For example, in the single-delta wound stator, the terminal "S" of the first pair of terminals for the first pole pair is internally connected to the external terminal "A," and the terminal "F" of the first pair of terminals for the first pole pair is internally connected to the external terminal "B." Although shown as extending across the stator 400, it is understood that the interconnection between the two poles in each pair is routed around the outer perimeter or in other unobstructing locations in the physical embodiment of the stator.

The second pole pair 420, 422 is wound with a second winding 450 that extends from a terminal "S" in a second pair of terminals 452, then around both poles and to a terminal "F" in the second pair of terminals. The second winding corresponds to a winding "WBC" in FIG. 3. The terminal "S" of the second pair of terminals for the second pole pair is internally connected to the external terminal "B," and the terminal "F" of the second pair of terminals for the second pole pair is internally connected to the external terminal "C."

The third pole pair 430, 432 is wound with a third winding 460 that extends from a terminal "S" in a third pair of terminals 462, then around both poles and to a terminal "F" in the third pair of terminals. The third winding corresponds to a winding "WAC" in FIG. 3. The terminal "S" of the third pair of terminals for the third pole pair is internally connected to the external terminal "C," and the terminal "F" of the third pair of terminals for the third pole pair is internally connected to the external terminal "A."

It is understood that the windings of FIG. 6 may also be interconnected in accordance with the diagram of FIG. 4 to form a wye-configuration by connecting the S terminals of the windings to the external terminals and by connecting the F terminals of the windings together to form the center node of the wye.

Figure 7:
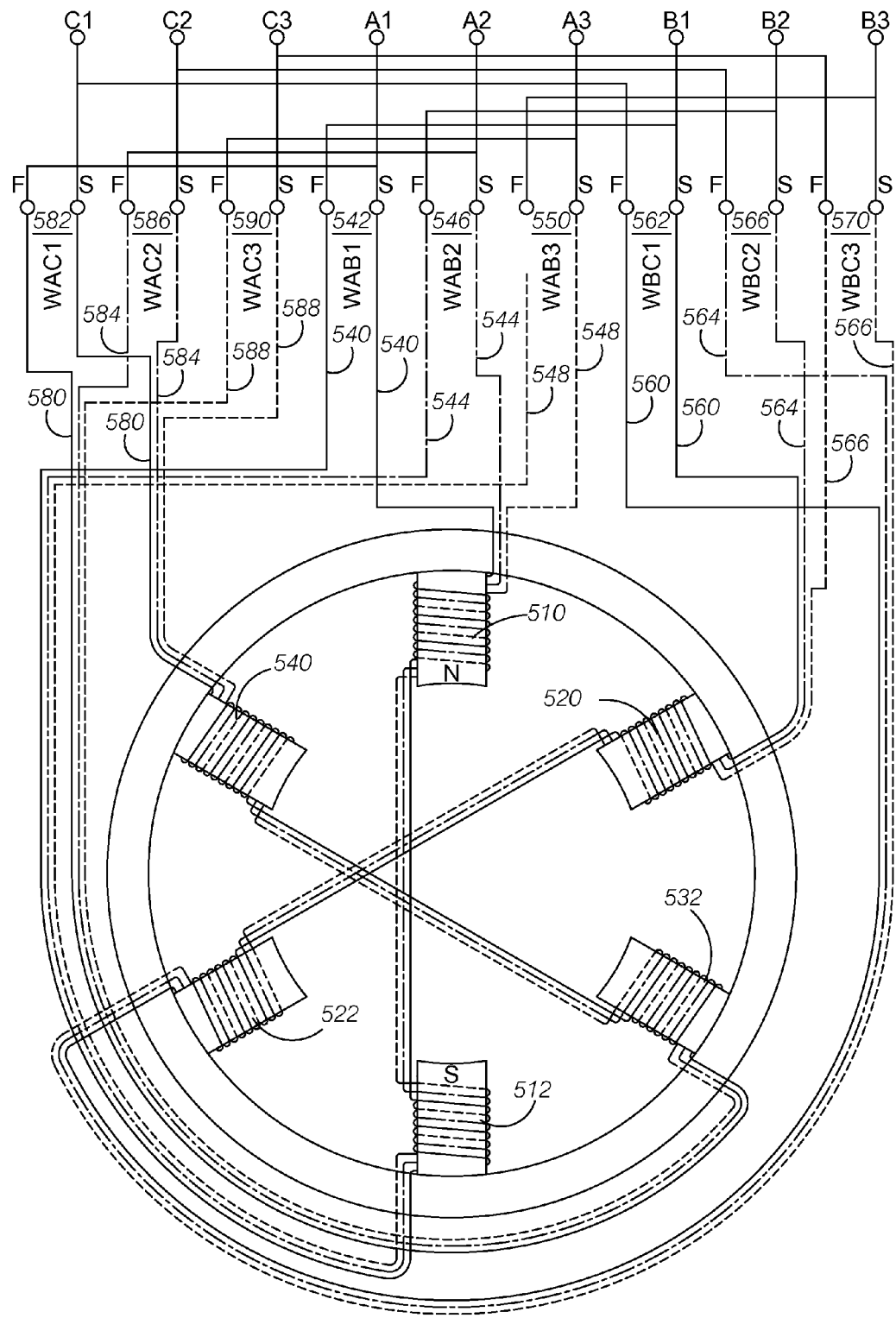
FIG. 7 pictorially illustrates a triple parallel-wound stator module interconnected in a delta configuration corresponding to FIG. 3.

FIG. 7 pictorially illustrates a portion of the inside structure of the first stator sections 142 in FIG. 1 having three parallel windings per pole interconnected to form a delta winding configuration. The other two stator sections 144, 146 have a corresponding structure and do not need to be illustrated. Similar to the single-delta wound stator 400 in FIG. 6, the first stator section in FIG. 7 comprises a first pair of poles 510, 512, a second pair of poles 520, 522, and a third pair of poles 530, 532, which are again labeled as "N" and "S" as discussed above.

Unlike the single-delta wound stator 400 of FIG. 65, each of the pole pairs of the triple-delta wound stator section 142 in FIG. 67 is wound with three windings. In FIG. 7, the first pole pair 510, 512 is wound with a first winding 540 that extends from a terminal "S" in a first pair of terminals 542. The first winding is wound around each pole in the first pole pair and returns to a terminal "F" in the first pair of terminals. The first winding corresponds to the winding WAB1 in the first delta winding 200 in FIG. 3. The terminal "S" of the first pair of terminals is internally connected to the external terminal "A1," and the terminal "F" of the first pair of terminals is internally connected to the external terminal "B1." The first winding is shown as a solid line to distinguish the first winding from the other two windings on the first pole pair.

The first pole pair 510, 512 is further wound with a second winding 544 that extends from a terminal "S" in a second pair of terminals 546. The second winding is wound around each pole in the first pole pair and returns to a terminal "F" in the second pair of terminals. The second winding corresponds to the winding WAB2 in the second delta winding 210 in FIG. 3. The terminal "S" of the second pair of terminals is internally connected to the external terminal "A2," and the terminal "F" of the second pair of terminals is internally connected to the external terminal "B2." The second winding is shown as a phantom line to distinguish the second winding from the other two windings on the first pole pair.

The first pole pair 510, 512 is further wound with a third winding 548 that extends from a terminal "S" in a third pair of terminals 550. The third winding is wound around each pole in the first pole pair and returns to a terminal "F" in the third pair of terminals. The third winding corresponds to the winding WAB3 in the third delta winding 220 in FIG. 3. The terminal "S" of the third pair of terminals is internally connected to the external terminal "A3," and the terminal "F" of the third pair of terminals is internally connected to the external terminal "B3." The third winding is shown as a dashed line to distinguish the third winding from the other two windings on the first pole pair.

The second pole pair 520, 522 is wound with a fourth winding 560 that extends from a terminal "S" in a fourth pair of terminals 562. The fourth winding is wound around each pole in the second pole pair and returns to a terminal "F" in the fourth pair of terminals. The fourth winding corresponds to the winding WBC1 in the first delta winding 200 in FIG. 3. The terminal "S" of the fourth pair of terminals is internally connected to the external terminal "B1," and the terminal "F" of the fourth pair of terminals is internally connected to the external terminal "C1." The fourth winding is shown as a solid line to distinguish the fourth winding from the other two windings on the second pole pair.

The second pole pair 520, 522 is further wound with a fifth winding 564 that extends from a terminal "S" in a fifth pair of terminals 566. The fifth winding is wound around each pole in the second pole pair and returns to a terminal "F" in the fifth pair of terminals. The fifth winding corresponds to the winding WBC2 in the second delta winding 210 in FIG. 3. The terminal "S" of the fifth pair of terminals is internally connected to the external terminal "B2," and the terminal "F" of the fifth pair of terminals is internally connected to the external terminal "C2." The fifth winding is shown as a phantom line to distinguish the fifth winding from the other two windings on the second pole pair.

The second pole pair 520, 522 is further wound with a sixth winding 568 that extends from a terminal "S" in a sixth pair of terminals 570. The sixth winding is wound around each pole in the second pole pair and returns to a terminal "F" in the sixth pair of terminals. The sixth winding corresponds to the winding WBC3 in the third delta winding 220 in FIG. 3. The terminal "S" of the sixth pair of terminals is internally connected to the external terminal "B3," and the terminal "F" of the sixth pair of terminals is internally connected to the external terminal "C3." The sixth winding is shown as a dashed line to distinguish the sixth winding from the other two windings on the second pole pair.

The third pole pair 530, 532 is wound with a seventh winding 580 that extends from a terminal "S" in a seventh pair of terminals 582. The seventh winding is wound around each pole in the third pole pair and returns to a terminal "F" in the seventh pair of terminals. The seventh winding corresponds to the winding WAC1 in the first delta winding 200 in FIG. 3. The terminal "S" of the seventh pair of terminals is internally connected to the external terminal "C1," and the terminal "F" of the seventh pair of terminals is internally connected to the external terminal "A1." The seventh winding is shown as a solid line to distinguish the seventh winding from the other two windings on the third pole pair.

The third pole pair 530, 532 is further wound with a eighth winding 584 that extends from a terminal "S" in a eighth pair of terminals 586. The eighth winding is wound around each pole in the third pole pair and returns to a terminal "F" in the fifth pair of terminals. The eighth winding corresponds to the winding WAC2 in the second delta winding 210 in FIG. 3. The terminal "S" of the eighth pair of terminals is internally connected to the external terminal "C2," and the terminal "F" of the eighth pair of terminals is internally connected to the external terminal A2." The eighth winding is shown as a phantom line to distinguish the eighth winding from the other two windings on the third pole pair.

The third pole pair 530, 532 is further wound with a ninth winding 588 that extends from a terminal "S" in a ninth pair of terminals 590. The ninth winding is wound around each pole in the third pole pair and returns to a terminal "F" in the ninth pair of terminals. The ninth winding corresponds to the winding WAC3 in the third delta winding 220 in FIG. 3. The terminal "S" of the ninth pair of terminals is internally connected to the external terminal "C3," and the terminal "F" of the ninth pair of terminals is internally connected to the external terminal "A3." The ninth winding is shown as a dashed line to distinguish the ninth winding from the other two windings on the third pole pair.

Figure 8:
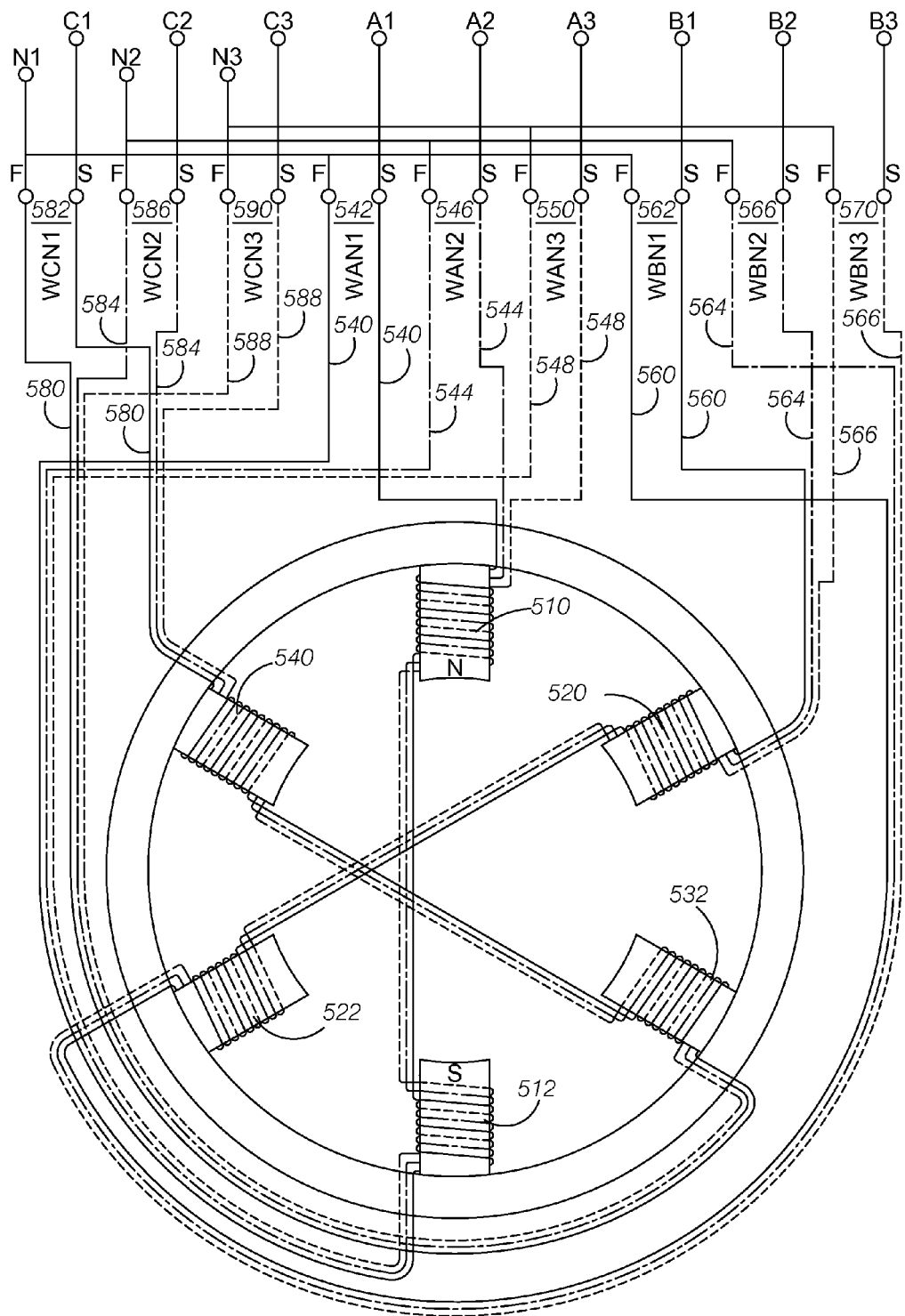
FIG. 8 pictorially illustrates a triple parallel-wound stator module interconnected in a wye (star) configuration corresponding to FIG. 4.

FIG. 8 illustrates the winding configuration of FIG. 7 with the windings interconnected to form a wye (star) configuration. The poles and windings correspond to the poles and windings of FIG. 7 and are numbered accordingly. Each winding section is renamed in FIG. 8 to correspond to the naming convention in the schematic illustration in FIG. 4. In particular, the first winding 540 is identified as WAN1, the second winding 544 is identified as WAN2, the third winding 548 is identified as WAN3, the fourth winding 560 is identified as WBN1, the fifth winding 564 is identified as WBN2, the sixth winding 568 is identified as WBN3, the seventh winding 580 is identified as WCN1, the eighth winding 584 is identified as WCN2 and the ninth winding 588 is identified as WCN3. Unlike the configuration in FIG. 7 where the F terminals of each winding are connected to S terminals of other windings, in FIG. 8, the F terminals of each of the parallel winding sets are interconnected to form the common node (N1, N2, N3) of the respective winding set as shown in FIG. 4.

The foregoing description illustrates a motor wherein an equivalent power output is provided by applying lower voltages and lower currents to multiple windings to reduce the input voltages to safe levels, to reduce the sizes of the wires using in the windings and the supply lines, and to reduce the $I^2R$ heat losses caused by the higher currents in conventionally wound motors.

Although described above in the context of triple-delta wound stator sections, the principles described herein could be modified to implement as triple-star wound stator sections.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A brushless DC electric motor, comprising:
    a housing;
    a first stator, a second stator and a third stator within the housing, each stator comprising:
        a first winding set comprising a respective first winding, a respective second winding and a respective third winding, each winding in the first winding set having a respective first end and a respective second end;
        a second winding set comprising a respective first winding, a respective second winding and a respective third winding, each winding in the second winding set having a respective first end and a respective second end;
        a third winding set comprising a respective first winding, a respective second winding and a respective third winding, each winding in the third winding set having a respective first end and a respective second end;
        a first set terminals accessible externally to the housing, the first set of terminals comprising at least three terminals, each of the three terminals of the first set of terminals connected to a respective first end of a respective one of the first, second and third windings of the first winding set, the respective second ends of the first, second and third windings in the first winding set connected to form one of a delta winding configuration or a wye winding configuration;

a second set terminals accessible externally to the housing, the second set of terminals comprising at least three terminals, each of the three terminals of the second set of terminals connected to a respective first end of a respective one of the first, second and third windings of the second winding set, the respective second ends of the first, second and third windings in the first winding set connected to form one of a delta winding configuration or a wye winding configuration; and a third set terminals accessible externally to the housing, the third set of terminals comprising at least three terminals, each of the three terminals of the third set of terminals connected to a respective first end of a respective one of the first, second and third windings of the third winding set, the respective second ends of the first, second and third windings in the first winding set connected to form one of a delta winding configuration or a wye winding configuration; and a rotor positioned in the housing within the first stator, the second stator and the third stator, the three stators operating in response to voltages applied to the first, second and third terminals of each of the stators to generate time-varying electromagnetic fields to cause the rotor to rotate.

* * * * *

UNITED STATES PATENT AND TRADEMARK OFFICE
CERTIFICATE OF CORRECTION

PATENT NO. : 8,283,831 B1  
APPLICATION NO. : 13/224715  
DATED : October 9, 2012  
INVENTOR(S) : Ilya Kaminsky and Robert J. Ferran Page 1 of 1

It is certified that error appears in the above-identified patent and that said Letters Patent is hereby corrected as shown below:

In the Claims:

In column 8 at line 64 (Claim 1 at line 18), replace "set terminals" with --set of terminals--;

In column 9 at line 6 (Claim 1 at line 27), replace "set terminals" with --set of terminals--;

In column 9 at line 16 (Claim 1 at line 37), replace "set terminals" with --set of terminals--.

Signed and Sealed this  
Twenty-fifth Day of June, 2013

Teresa Stanek Rea  
*Acting Director of the United States Patent and Trademark Office*